United States Patent [19]

Tucholski et al.

[11] Patent Number: 4,971,868
[45] Date of Patent: Nov. 20, 1990

[54] HERMETICALLY SEALED NONAQUEOUS CELL WITH POSITIVE TERMINAL PIN AND PERCHLORATE ELECTROLYTE

[75] Inventors: Gary R. Tucholski, Parma Heights; Earl J. Chaney, Jr., Medina, both of Ohio

[73] Assignee: Eveready Battery Company, Inc., St. Louis, Mo.

[21] Appl. No.: 372,200

[22] Filed: Jun. 26, 1989

Related U.S. Application Data

[63] Continuation of Ser. No. 926,107, Nov. 3, 1986, abandoned.

[51] Int. Cl.⁵ .................... H01M 6/16; H01M 2/30
[52] U.S. Cl. .................... 429/174; 429/181; 429/194; 429/196
[58] Field of Search ............... 429/56, 194, 196, 174, 429/181

[56] References Cited

U.S. PATENT DOCUMENTS

| | | | |
|---|---|---|---|
| 4,486,514 | 12/1984 | Chaney | 429/196 X |
| 4,490,449 | 12/1984 | Moses et al. | 429/196 |
| 4,499,160 | 2/1985 | Babai et al. | 429/196 X |

Primary Examiner—Stephen J. Kalafut
Attorney, Agent, or Firm—Virgil B. Hill

[57] ABSTRACT

An electrochemical cell is provided, which has a conductive housing that contains an active anode material and an active cathode material. The active cathode material is electrically isolated from the housing and the active anode material is electrically connected to the housing, thus making the housing the negative electrode terminal of the cell. The cell includes an electrically conductive pin member having a first portion that protrudes from the cell through an orifice in the cell housing and a second portion that is electrically connected to the active cathode material to make the pin member the positive electrode terminal of the cell. An electrically insulating member is disposed between the pin member and the wall of the orifice. The cell electrolyte comprises a metal perchlorate salt dissolved in a nonaqueous liquid.

13 Claims, 3 Drawing Sheets

HERMETICALLY SEALED NONAQUEOUS CELL WITH POSITIVE TERMINAL PIN AND PERCHLORATE ELECTROLYTE

This is a continuation of application Ser. No. 926,107, filed Nov. 3, 1986, now abandoned.

BACKGROUND OF THE INVENTION

This invention relates to nonaqueous galvanic cells, and more particularly to a construction for such cells that substantially reduces or eliminates self-discharge of the cell with time.

Galvanic cells are often constructed so that the cell container is used as one of the electrode terminals of the cell. In consequence, it is necessary to dispose an electrical insulator between the cell container and the other cell electrode terminal to prevent the cell from shorting.

In addition, galvanic cells typically are sealed to prevent leakage and consequent loss of electrolyte, and thus in the cell construction described above the electrical insulator should be securely bonded in a leakproof manner to both the cell container and the other cell electrode terminal. However, a consequence of such sealing is that certain operating conditions can cause the internal pressure of the cells to markedly increase. In cells utilizing a highly reactive anode material such as lithium, external sources such as fire or internal sources such as heat generated during charging can cause the anode to melt and vigorously react with the cathode and/or electrolyte, thereby resulting in a sharp increase in internal cell pressure. In the case of other galvanic cells, such as alkaline zinc cells, carbon zinc cells, etc., large quantities of gas are generated under certain conditions of use. Thus, if any of the foregoing cells were permanently sealed, the build up of internal pressure within the cell could cause the cell container to leak, bulge or even rupture, with the attendant possibility of property and/or bodily damage.

It is therefore necessary to provide a vent for galvanic cells which remains sealed during normal operating conditions, but which opens when the pressure within the cell substantially increases. To meet these objectives, cells have been made with a vent release mechanism. Referring to the situation where an electrical insulator is disposed between the cell container and a cell electrode terminal, the insulator can act both to isolate the cell container from a cell electrode terminal and as a vent release mechanism. Specifically, the insulator can be made of glass or ceramic material that is sufficiently thin so as to be frangible. The insulator is then disposed within and secured to a vent orifice that is usually located in the cell cover, so as to hermetically seal the vent orifice, and the cell electrode terminal passes through the central region of the insulator. When the pressure within the cell exceeds a predetermined limit, the frangible member fractures to release the excess pressure. In one type of cell, referred to as a flat cell, a short, cylindrical container holds a wafer-like anode comprising an active anode material, such as lithium, disposed over and separated from a wafer like cathode comprising an active cathode material, such as manganese dioxide. A ferrous metal, such as stainless steel, is commonly used for the container. This is because stainless steel is generally corrosion resistant, is easily formed or machined into an appropriate container shape and is electrically conductive so that the container itdischarge can form one terminal of the cell.

A container cover disposed over and separated from the anode is hermetically sealed to the cell container. The cathode is disposed to rest on the bottom of the cell container, thereby making the container the positive electrode terminal of the cell. In contrast, the anode is electrically isolated from the container.

So that electrical contact can be established with the anode, a disk-shaped current collector plate is disposed over and placed in physical (and thus electrical) contact with the anode, and a collector insulator is placed between the current collector plate and the cover to maintain the electrical isolation of the anode from the container. A cylindrical pin typically made of a ferrous material, such as stainless steel, is placed in electrical contact with the current collector plate and disposed to protrude through an orifice in the cell cover to form the negative electrode terminal of the cell. An annular seal typically made of glass is disposed within the orifice between the pin and the cell cover to hermetically seal the cell. This seal will fracture when pressure within the cell substantially increases, thereby relieving the pressure.

Corrosion problems in the foregoing cell construction have arisen in connection with the glass seal. Specifically, in the case of alkali metal anodes, especially lithium, it has been found that during storage a conductive corrosive deposit grows from the negative electrode terminal pin across and into the seal undersurface toward the cell container, which is the positive electrode terminal of the cell. This deposit grows until the glass seal is bridged and the cell is shorted, thereby causing the cell to self-discharge. Moreover, during the course of its growth the deposit corrodes the glass seal, which gives rise to the possibility of cell leakage.

While the exact nature and cause of the conductive corrosive deposit are not known, it is believed to be a lithium-modified ferrous compound caused by a complex reaction that is at least a function of the cell potential and the material compositions of the anode, those portions of the cell structure that are in electrical contact with the cathode material, and the glass seal.

Efforts to prevent premature failure of the cell and thereby prolong the shelf life of lithium cells have for the most part concentrated on the seal composition and/or effective coatings for the seal.

For example, Sandia Report #83-2314 of September, 1984, "Glass Corrosion in Liquid Lithium", suggests that certain glass compositions are better able to withstand corrosion by liquid lithium than others. In U.S. Pat. No. 4,168,351, corrosion of a seal is retarded by coating the entire glass surface exposed to the interior of the cell with a protective material such as a metal oxide, polyolefin or fluorocarbon polymer. In U.S. Pat. No. 4,233,372, an inert polymeric coating is applied over the glass surface exposed to the cell environment to reduce chemical attack on the glass, and in European Pat. No. 35,074, the exposed glass surface is protected by a silicone layer. A still further solution to the problem of glass corrosion is proposed by U.S. Pat. No. 4,308,323, wherein the resistance of the glass to chemical attack is improved by a graded seal composed of one glass composition bonded to the terminal pin and another glass composition bonded to the wall of the container.

An alternative approach to solving the corrosion problem is to be found in U.S. Pat. No. 4,609,598, issued to Gary Tucholski and Earl Chaney, Jr., the same inventors as herein, and assigned to the assignee of this invention. In that patent, all metal components of the cell electronically connected to the cathode are made of a non-ferrous metal, such as molybdenum. This construction decreases the deposition of conductive corrosive material on the glass seal, and thus the resulting seal corrosion.

SUMMARY OF THE INVENTION

The present invention helps to greatly reduce or eliminate cell self-discharge and seal corrosion due to deposition of conductive corrosive materials on the seal. In the electrochemical cell of the present invention, there is provided a conductive cell housing containing an active anode material and an active cathode material. The active cathode material is electrically isolated from the housing and the active anode material is electrically connected to the housing, so as to make the housing the negative electrode terminal of the cell. The electrochemical cell also includes an electrically conductive pin member having a first portion that protrudes from the cell through an orifice in the cell housing, and a second portion that is electrically connected to the active cathode material to make the pin member the positive electrode terminal of the cell. An electrically insulating member is disposed between the pin member and the wall of the orifice, and the cell is further provided with an electrolyte comprising a metal perchlorate salt dissolved in a nonaqueous liquid.

DESCRIPTION OF THE PREFERRED EMBODIMENT

Figure 1:
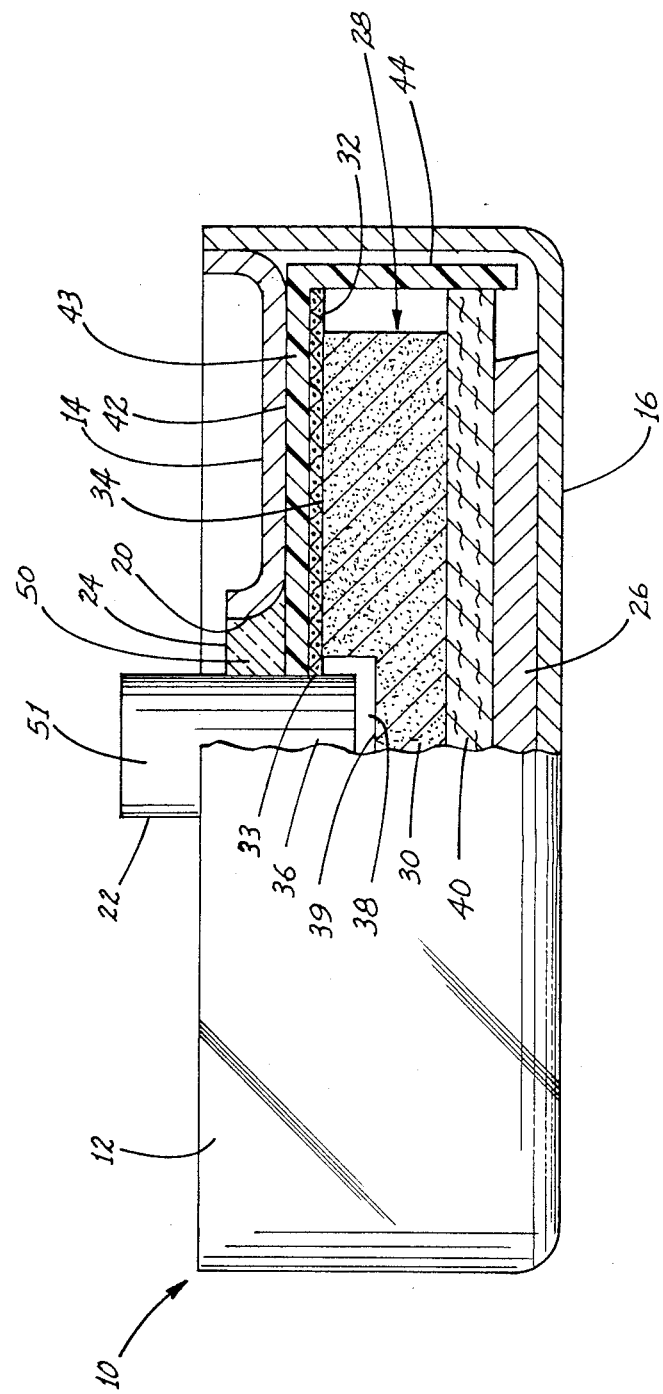
FIG. 1 is an elevational view, partly broken away and in section, showing a flat electrochemical cell embodying this invention.

Referring to FIG. 1, there is shown a cross-sectional view of a cylindrical cell 10 that employs the present invention, although this invention is equally suitable for cells having other geometric shapes. The housing of the cell is defined principally by an open-ended cell container 12 made of a conductive material, such as stainless steel, and a cell cover 14 also made of a conductive material, such as stainless steel. The cover 14 is secured to cell container 12, as by laser welding the two components together. The cell 10 contains anode 26 and cathode 30.

Anode 26 generally is a consumable metal and can be an alkali metal, an alkaline earth metal, or an alloy of alkali metals or alkaline earth metals with each other and other metals ("alloy" as used herein includes mixtures, solid solutions such as lithium magnesium, and intermetallic compounds such as lithium monoaluminide). The preferred materials for anode 26 are the alkali metals, particularly lithium, sodium and potassium, and the alkaline earth metals, particularly calcium and magnesium. Lithium is the especially preferred material for anode 26.

In the embodiment shown, the anode 26 is in the form of a relatively thin wafer of lithium having one of its flat surfaces disposed against the inner surface of the container bottom wall 16. This electrically connects the anode 26 to the container 12, thereby rendering container 12 the negative electrode terminal of the cell.

Also disposed within the container is a cathode assembly 28 that includes a cathode 30 and a current collector plate 32. The active cathode material of cathode 30 is a solid, such as manganese dioxide, iron disulfide, titanium disulfide, antimony trisulfide, molybdenum disulfide, molybdenum trisulfide, niobium triselenide, bismuth oxide, vanadium pentoxide, or a polycarbon fluoride such as $(C_2F)_n$ or $(CF_x)_n$ (where x ranges from greater than 0.0 to about 1.2), or mixtures thereof. The active cathode material is mixed with a binder and a conductor to form cathode 30.

Cathode 30 is separated from anode 26 by a separator 40. Separator 40 should be electrically non-conductive, but ionically permeable so as to allow ion transport between anode 26 and cathode 30. Accordingly, separator 40 can be a felted glass fiber fabric that is impregnated with a liquid electrolyte having a composition that is described in greater detail below.

Disk-shaped current collector plate 32 is made of a ferrous or non-ferrous metal and is positioned against and in electrical contact with cathode 30. In the present invention, ferrous metals are preferred for collector plate 32 over non-ferrous metals because of their lower cost. Current collector plate 32 is placed in intimate contact with cathode face 34 of cathode 30. Preferably, the surface of current collector plate 32 in contact with cathode face 34 is precoated with a conductive carbon coating.

Both cathode 30 and current collector plate 32 are electrically insulated from cell container 12 and cell cover 14 by insulator 42, which comprises a disk-shaped insulating section 43 disposed between collector plate 32 and cell cover 14, and an insulative skirt 44 depending from the edge of insulating section 43 so as to circumscribe the periphery of each of collector plate 32, cathode 30, and separator 40, as well as a portion of the periphery of anode 26. Insulator 42 should be made of a material that is compatible with the cell components, such as polypropylene or Tefzel ®, the later being available from E. I. du Pont de Nemours & Co., Wilmington, Del.

Cell cover 14 contains an orifice 50, which, as can be seen in FIG. 1, may be defined by an upturned circular flange 20. An electrically conductive generally cylindrical pin member 22, which has a first portion 51, protrudes through the orifice 50. The current collector plate 32 in turn is connected to a second portion 36 of pin member 22 by any suitable mechanical and electrical connection which electronically connects the collector plate 32 and the pin member 22, thereby rendering the pin member 22 the positive electrode terminal of the cell. In fact, pin member 22 can be releasably secured to collector plate 32 by press-fitting pin member 22 into orifice 33 of collector 32. Such a connection improves the venting of pressure generated in the cell during abnormal operating conditions, as more fully described in application Ser. No. 886,620, and filed on July 18, 1986 by inventors Gary Tucholski and Earl Chaney Jr., which application is assigned to the assignee of this invention. The contents of that application are incorporated by reference herein. As was the case with collector plate 32, it is preferred to make pin member 22 of a ferrous metal, as opposed to a non-ferrous metal, again because of lower cost.

An annular seal member 24 is disposed in orifice 50 between circular flange 20 and pin member 22. Seal member 24 is bonded (in the case of a glass seal, fused, and in the case of a ceramic seal, brazed) to both circular flange 20 and pin member 22 to hermetically seal the cell and secure pin member 22 in its proper location. Seal member 24 is made of an insulative material that will electrically isolate pin member 22 from cell cover 14, and preferably is made sufficiently thin so that it is frangible. Thus, when the pressure within the cell reaches a certain level, the material will fracture to form a path, or contribute to forming a path, from inside the cell to the atmosphere for the release of excess pressure. Seal member 24 is preferably made of a glass, such as borosilicate glass, or a ceramic material, such as alumina.

As shown in FIG. 1, cathode face 34 of cathode 30 has a portion of its surface defining a recess 38. The second portion 36 of pin member 22 extends through an opening 33 in the cathode collector and is received in the recess. The recess 38 is large enough so that the bottom 39 of the recess is spaced from the second portion 36 of pin member 22 to provide clearance around the end portion of the pin member 22. This clearance insures that seal member 24 is not subjected to stress when the cell is assembled. In this respect, during the course of fabrication, cover 14 together with pin member 22 and seal member 24 is preassembled and then attached as a unit to container 12. Should the second portion 36 of the pin member 22 press against the cathode 30 during such assembly, the resulting axial force on the pin member 22 could cause damage to, or even failure of, seal member 24. The clearance about pin member 22, as provided by the recess 38, insures that such contact does not occur.

The internal arrangement of cell 10 shown in FIG. 1 results in pin member 22 being the positive electrode terminal of cell 10, with anode 26 being positioned away from seal member 24 and in electrical contact with cell container 12. Any corrosive deposit that does occur starts at the outer periphery of the undersurface of seal member 24, rather than at the junction of pin member 22 and seal member 24. In addition, the deposit grows inwardly at a slower rate and in a physical form less conducive to shorting across seal member 24, than is the case with pin member 22 being the negative electrode terminal of cell 10.

The creation and growth of the conductive corrosive deposit is further dramatically reduced if the liquid electrolyte with which separator 40 is impregnated comprises a metal perchlorate salt dissolved in a nonaqueous liquid. Upon onset of the corrosion reaction, the perchlorate salt causes the formation of a thin passivation layer on the ferrous metal components in contact with the cathode material, which prevents their further corrosion and thus arrests the growth of the lithium-modified conductive ferrous deposit on the undersurface of seal member 24.

The perchlorate salt usable in this invention can be an alkali or alkaline earth metal perchlorate, such as lithium perchlorate. The nonaqueous liquid solvent can be an organic solvent, such as a mixture of equal parts by volume of propylene carbonate and dimethoxyethane. Provided that the perchlorate salt is the predominant solute, small amounts of other solutes may be included in the electrolyte.

Since the passivation layer has been found to be chromium-rich, it is preferred for the ferrous metal components in electrical contact with the cathode material to have a high chromium content. Thus, in the embodiment shown in FIG. 1, it is preferred for pin member 22 to be made of a 400 series stainless steel, specifically 446 stainless steel.

To fabricate the cell shown in FIG. 1, seal member 24 is positioned within orifice 50 of cell cover 14, and pin member 22 is positioned within seal member 24. This assembly is then heated to seal pin member 22 and the periphery of orifice 50 to seal member 24. Next, the assembly is inverted, a preformed insulator 42 is placed over pin member 22, and current collector plate 32 having precoated surface 24 is placed over pin member 22 and on top of preformed insulator 42, such that the edges of aperture 33 of the current collector plate are in contact with pin member 22. Next, cathode 30 is disposed over and contacts surface 34 of current collector plate 32, in the manner shown in FIG. 1. A preformed separator 40 is then placed onto cathode 30 and an electrolyte, comprising lithium perchlorate dissolved in egual parts of propylene carbonate and dimethoxyethane, is dispensed onto the separator 40. Anode 26 is secured, as by ultrasonic or cold welding, to the inner surface of the container bottom wall 16, to form an anode assembly. This anode assembly is inverted and placed over the above-described cathode assembly to form cell 10. The cell 10 is then turned right-side up, cover 14 is properly seated within container 12, and the cell 10 is welded shut.

Figure 2:
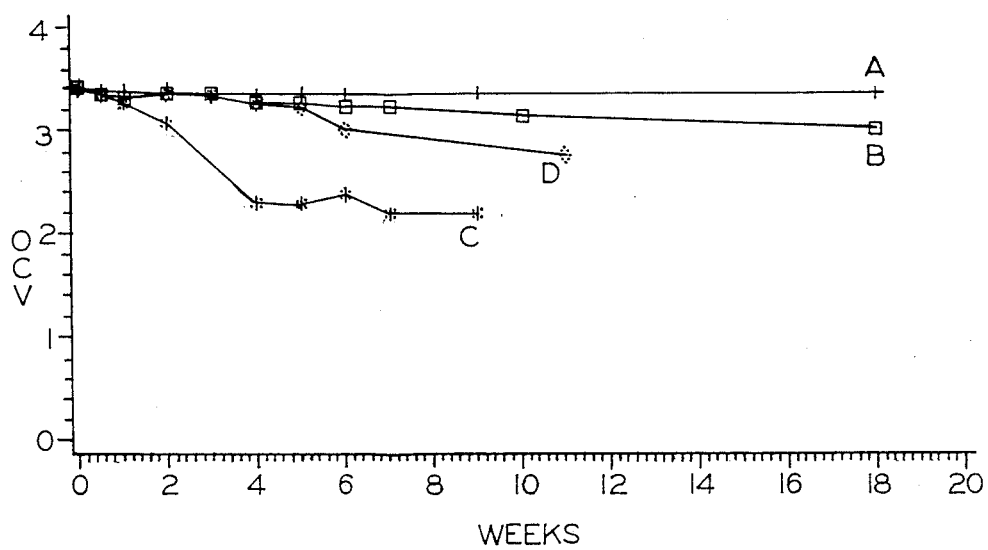
FIGS. 2 and 3 are graphs showing the variation in open circuit voltage of each of a number of cells with time.

FIG. 2 compares the average open circuit voltages during elevated temperature storage (85° C.) of four cell lots (five cells per cell lot) fabricated as shown in FIG. 1 using different electrolytes. The curves shown in FIG. 2, labeled A, B, C and D, reflect the performance of cell lots having the following electrolytes:

| Cell Lot | Electrolyte |
| --- | --- |
| A | 1.0 M $LiClO_4$ dissolved in:<br>50% propylene carbonate;<br>and<br>50% dimethoxyethane. |
| B | 1.0 M $LiCF_3SO_3$ dissolved in:<br>40% dioxolane;<br>30% dimethoxyethane;<br>30% 3 methyl-2-oxazolidone; and<br>0.2% 3,5-dimethyl isoxazole. |
| C | 1.0 M $LiCF_3SO_3$ dissolved in:<br>50% propylene carbonate; and<br>50% dimethoxyethane. |
| D | 50% electrolyte of Cell C and 50% electrolyte of Cell A |

Otherwise, each of the cells was identically constructed with a lithium anode, a manganese dioxide cathode, a pin member 22 made of 446 stainless steel, and a seal member 24 consisting of a type 364U uncolored alkali silicate glass member, available from Glass Beads Company, 580 Monastery Drive, Latrobe, Pa. 15650.

As can be seen in FIG. 2, Cell Lot A showed an essentially constant open circuit voltage for the 18 week test period and exhibited remarkably better performance than Cell Lot C, which differed only in the composition of the electrolyte solute. Cell Lot A's performance was also significantly better than the performance of Cell Lot B (note that Cell Lot B contained the same solute as, but a different solvent than, Cell Lot C). Indeed, the present invention reduces the growth rate of conductive corrosive deposits on the undersurface of seal member 24 such that a thirty year shelf life at 20° C. is predicted.

Figure 3:
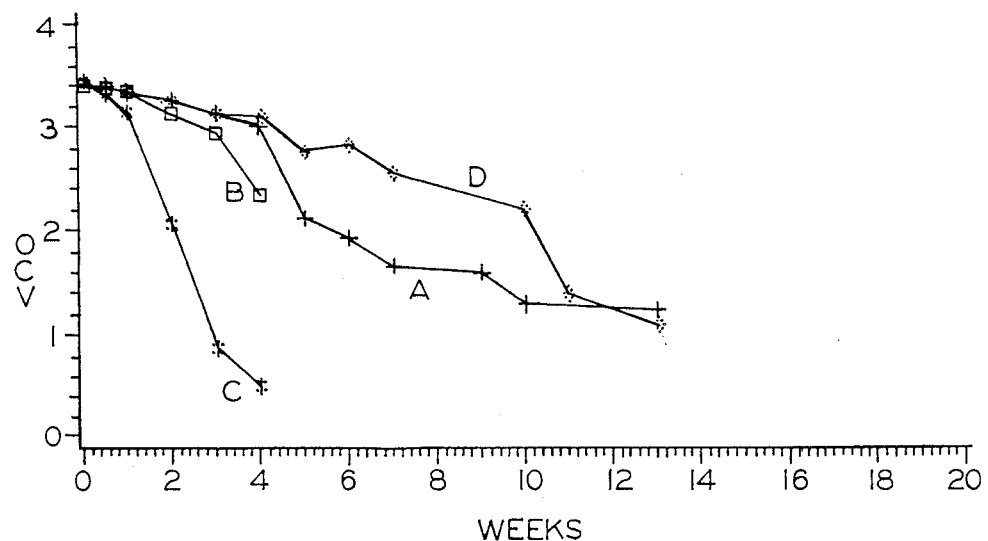

For purposes of comparison, FIG. 3 shows the average open circuit voltages during elevated temperature storage (85° C.) of four cell lots of the same construction used in the tests shown in FIG. 2, except that each was fabricated so that its cell polarity was the reverse of the FIG. 2 cells. Thus, the pin member 22 of each cell was electrically connected to the anode, and the cell container 12 of each was electrically connected to the cathode.

As shown in FIG. 3, the open circuit voltages of all of the cells decreased substantially with time, relative to their FIG. 2 counterparts. Indeed, the open circuit voltage of Cell Lot A, which uses a perchlorate electrolyte in accordance with this invention, for the most part fell more rapidly than Cell Lot D, which had the mixed electrolyte. Thus FIG. 3 demonstrates the need for the polarity of the FIG. 1 cell along with the disclosed perchlorate electrolyte.

While this invention can be utilized to prevent the growth of corrosive conductive deposits in any cell having an insulating seal, it is believed especially useful in connection with the higher voltage lithium cell systems.

We claim:

1. An hermetically sealed electrochemical cell comprising:
   (a) an electrically conductive cell housing containing an active anode material selected from the group consisting of lithium, sodium, potassium, calcium, and a solid active cathode material selected from the group consisting of manganese dioxide, iron disulfide, molybdenum disulfide, molybdenum trisulfide, niobium triselenide, bismuth oxide, vanadium pentoxide, polycarbon fluorides, and mixture thereof, the solid active cathode material being electrically isolated from the housing and the active anode material being electrically connected to the housing so as to make the housing the negative electrode terminal of the cell;
   (b) an electrically conductive pin member having a first portion that protrudes from the cell through an orifice in the cell housing and a second portion that is electrically connected to the solid active cathode material so as to make the pin member the positive terminal;
   (c) an electrically insulating member disposed between the pin member and the wall of the orifice, which provides the hermetic seal; and
   (d) an electrolyte consisting essentially of a metal perchlorate salt dissolved in a nonaqueous liquid.

2. JThe electrochemical cell in claim 1, wherein the metal perchlorate salt is an alkali or alkaline earthj metal perchlorate salt.

3. The electrochemical cell as in claim 1, wherein the pin member is made from a ferrous metal.

4. The electrochemical cell as in claim 2, wherein the perchlorate salt id lithium perchlorate.

5. The electrochemical cell as in claim 3, wherein the pin member is made from 446 stainless steel.

6. The electrochemical cell of claim 1, wherein the active anode material is lithium.

7. The electrochemical cell as in claim 6, wherein the active cathode material is manganese dioxide.

8. The electrochemical cell as in claim 2, wherein the nonaqueous liquid is an organic solvent.

9. The electrochemical cell as in claim 8, wherein the organic solvent is a mixture of dimethoxyethane and propylene carbonate.

10. The electrochemical cell as in claim 1, wherein the electrically insulating member is frangible.

11. The electrochemical cell as in claim 10, wherein the frangible insulating member is made of a material selected from the group consisting of glass and ceramic.

12. An hermetically sealed electrochemical cell comprising:
   (a) an electrically conductive cell housing containing a lithium anode and a solid maganese dioxide cathode, the solid cathode being electrically isolated from the housing and the anode being electrically connected to the housing so as to make the cell housing the negative electrode terminal of the cell;
   (b) an electrically conductive pin member made of stainless steel and having a first portion that protrudes from the cell through an orifice in the cell housing and a second portion that is electrically connected to the solid cathode so as to make the pin member the positive electrode terminal of the cell,
   (c) a frangible glass seal disposed between the pin member and the wall of the orifice, which provides the hermetic seal; and
   (d) an electrolyte consisting essentially of lithium perchlorate dissolved in a mixture of propylene carbonate and dimethoxyethane.

13. In a hermetically sealed electrochemical cell having a conductive cell housing containing an active anode material and a solid active cathode material, the improvement comprising providing the solid active cathode material to be electrically isolated from the housing and the active anode material to be electrically connected to the housing so as to make the housing the negative electrode terminal of the cell, employing an electrically conductive pin member having a first portion that protrudes from the cell through an orifice of the cell housing, and a second portion that is electrically connected to the solid active cathode material to make the pin member the positive electrode terminal of the cell, and employing an electrically insulating member disposed between the pin member and the wall of the orifice to provide the hermetic seal, and employing an electrolyte consisting essentially of a metal perchlorate salt dissolved in a nonaqueous liquid.

* * * * *